United States Patent
Terwilliger

(10) Patent No.: US 11,548,651 B2
(45) Date of Patent: Jan. 10, 2023

(54) ASYMMETRIC HYBRID AIRCRAFT IDLE

(71) Applicant: Raytheon Technologies Corporation, Farmington, CT (US)

(72) Inventor: Neil Terwilliger, Meriden, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 143 days.

(21) Appl. No.: 16/936,595

(22) Filed: Jul. 23, 2020

(65) Prior Publication Data

US 2021/0222629 A1    Jul. 22, 2021

Related U.S. Application Data

(60) Provisional application No. 62/878,442, filed on Jul. 25, 2019.

(51) Int. Cl.
*B64D 27/24* (2006.01)
*F01D 15/10* (2006.01)
(Continued)

(52) U.S. Cl.
CPC ............ *B64D 27/24* (2013.01); *B60K 6/48* (2013.01); *B60W 10/06* (2013.01); *B60W 10/08* (2013.01);
(Continued)

(58) Field of Classification Search
CPC .... B64D 27/24; B64D 2027/026; B60K 6/48; B60W 10/06; B60W 10/08; F01D 15/10; F02C 7/36; F02C 9/42; F02K 3/06; F05D 2220/323; F05D 2220/76; F05D 2260/85; F05D 2270/051; F05D 2270/304
See application file for complete search history.

(56) References Cited

U.S. PATENT DOCUMENTS 4,541,237 A    9/1985    Dickey
8,857,191 B2   10/2014   Hyde et al.
(Continued)

FOREIGN PATENT DOCUMENTS

EP    2452876 A2    5/2012
WO    2018211227 A1    11/2018

OTHER PUBLICATIONS

EP Application No. 20187729.7 Extended EP Search Report dated Jan. 12, 2021, 6 pages.

Primary Examiner — Gerald L Sung
Assistant Examiner — Rene D Ford
(74) Attorney, Agent, or Firm — Cantor Colburn LLP

(57) ABSTRACT

A system of a hybrid aircraft includes a first gas turbine engine including a fan, a high speed spool, and a low spool motor configured to drive rotation of the fan. The system also includes a second gas turbine engine and a controller. The controller is operable to determine an operating mode of the hybrid aircraft, control the low spool motor to drive rotation of the fan of the first gas turbine engine responsive to a thrust command while the second gas turbine engine is driven by commanding fuel combustion based on the operating mode, and accelerate the high speed spool of the first gas turbine engine and command fuel combustion at the first gas turbine engine based on a transition of the operating mode to perform a starting operation of the first gas turbine engine.

20 Claims, 4 Drawing Sheets

(51) Int. Cl.
*F02C 7/36* (2006.01)
*F02C 9/42* (2006.01)
*F02K 3/06* (2006.01)
*B64D 27/02* (2006.01)
*B60W 10/06* (2006.01)
*B60W 10/08* (2006.01)
*B60K 6/48* (2007.10)

(52) U.S. Cl.
CPC ........ *B64D 2027/026* (2013.01); *F01D 15/10* (2013.01); *F02C 7/36* (2013.01); *F02C 9/42* (2013.01); *F02K 3/06* (2013.01); *F05D 2220/323* (2013.01); *F05D 2220/76* (2013.01); *F05D 2260/85* (2013.01); *F05D 2270/051* (2013.01); *F05D 2270/304* (2013.01)

(56) References Cited

U.S. PATENT DOCUMENTS

| | | |
|---|---|---|
| 9,099,882 B2 | 8/2015 | Lammers et al. |
| 9,429,077 B2 | 8/2016 | Morgan |
| 10,094,293 B2 * | 10/2018 | Perkinson ............... B64D 27/10 |
| 2007/0101721 A1 * | 5/2007 | Dooley ................... F02C 7/268 |
| | | 60/721 |
| 2012/0153076 A1 * | 6/2012 | Burns ....................... F02C 7/36 |
| | | 60/785 |
| 2014/0225378 A1 * | 8/2014 | Anastasio ............. F02N 11/006 |
| | | 290/38 R |
| 2016/0355272 A1 * | 12/2016 | Moxon .................. B64D 35/04 |
| 2017/0190441 A1 * | 7/2017 | Mackin ................... F01D 25/36 |
| 2017/0226934 A1 | 8/2017 | Robic et al. |
| 2017/0275009 A1 * | 9/2017 | Huang ................... B64D 27/24 |
| 2018/0002025 A1 * | 1/2018 | Lents ......................... F02K 3/06 |
| 2018/0003072 A1 | 1/2018 | Lents et al. |
| 2018/0354632 A1 | 12/2018 | Hon et al. |
| 2018/0363564 A1 * | 12/2018 | Geneste ................. H02K 7/1823 |
| 2019/0002115 A1 * | 1/2019 | Miller ................... B64D 31/06 |
| 2019/0264615 A1 * | 8/2019 | Husband ................. F02C 7/275 |
| 2019/0322379 A1 * | 10/2019 | Mackin ................... F02C 7/057 |
| 2020/0023982 A1 * | 1/2020 | Kupratis ................. F02K 3/06 |
| 2020/0095939 A1 * | 3/2020 | Epstein .................. B64D 31/02 |
| 2020/0347743 A1 * | 11/2020 | Long ..................... B64D 27/02 |
| 2021/0362862 A1 * | 11/2021 | Jaljal ....................... F02C 7/32 |

* cited by examiner

ASYMMETRIC HYBRID AIRCRAFT IDLE

CROSS-REFERENCE TO RELATED APPLICATION

This application claims the benefit of priority to U.S. Provisional Application No. 62/878,442 filed Jul. 25, 2019, the disclosure of which is incorporated herein by reference in its entirety.

BACKGROUND

The subject matter disclosed herein generally relates to rotating machinery and, more particularly, to a method and an apparatus for asymmetric hybrid aircraft idle.

Gas turbine engines are typically inefficient to operate at low power settings. Operation of a gas turbine engine at idle is the typical lowest power setting available once the gas turbine engine has been started. In some instances, thrust produced at idle may be greater than the thrust needed for ground-based operations, such as taxiing and waiting in a parked position prior to takeoff or after landing. This can result in excess fuel consumption and may reduce engine component life with many repeated taxi, takeoff, and landing cycles.

In some modes of operation, fuel consumption can be reduced by only running one engine, such as during taxi or aircraft descent. However, operating an aircraft with a single engine producing thrust can create a yawing moment on the aircraft that may necessitate compensation actions. Further, the engine that is non-operational may need time to support starting prior to a mode transition of the aircraft or in the event that the fuel-burning engine shuts off unexpectedly.

BRIEF DESCRIPTION

According to one embodiment, a system of a hybrid aircraft includes a first gas turbine engine including a fan, a high speed spool, and a low spool motor configured to drive rotation of the fan. The system also includes a second gas turbine engine and a controller. The controller is operable to determine an operating mode of the hybrid aircraft, control the low spool motor to drive rotation of the fan of the first gas turbine engine responsive to a thrust command while the second gas turbine engine is driven by commanding fuel combustion based on the operating mode, and accelerate the high speed spool of the first gas turbine engine and command fuel combustion at the first gas turbine engine based on a transition of the operating mode to perform a starting operation of the first gas turbine engine.

In addition to one or more of the features described above or below, or as an alternative, further embodiments may include where the controller is further operable to control the low spool motor responsive to the thrust command with the operating mode being taxi or descent.

In addition to one or more of the features described above or below, or as an alternative, further embodiments may include a high spool motor configured to augment rotational power of the high speed spool, where the controller is configured to control the high spool motor to accelerate the high speed spool during the starting operation of the first gas turbine engine while the low spool motor controls thrust produced by a low speed spool of the first gas turbine engine.

In addition to one or more of the features described above or below, or as an alternative, further embodiments may include where the starting operation includes a ground-based start or an in-flight restart.

In addition to one or more of the features described above or below, or as an alternative, further embodiments may include at least one generator configured to extract power from the second gas turbine engine, where the controller is configured to selectively provide electrical power from the at least one generator to either or both of the low spool motor and the high spool motor.

In addition to one or more of the features described above or below, or as an alternative, further embodiments may include where the low spool motor is powered by one or more of a generator, an energy storage system, and a power source external to the first gas turbine engine.

In addition to one or more of the features described above or below, or as an alternative, further embodiments may include where one or more accessories of the first gas turbine engine are powered while the first gas turbine engine is not commanded to combust fuel.

In addition to one or more of the features described above or below, or as an alternative, further embodiments may include where the controller is operable to control the low spool motor to drive rotation of the low speed spool responsive to the thrust command at an idle condition of the first gas turbine engine.

In addition to one or more of the features described above or below, or as an alternative, further embodiments may include where the controller is operable to control power delivery to the high speed spool while the first gas turbine engine is not commanded to combust fuel, and the power delivery is operable to rotate or heat the high speed spool.

In addition to one or more of the features described above or below, or as an alternative, further embodiments may include where the controller is operable to change a designation of the first gas turbine engine and the second gas turbine engine between flights of the hybrid aircraft.

According to an embodiment, a method includes determining an operating mode of a hybrid aircraft including a first gas turbine engine and a second gas turbine engine, where the first gas turbine engine includes a fan and a low spool motor configured to drive rotation of the fan. The low spool motor is controlled to drive rotation of the fan of the first gas turbine engine responsive to a thrust command while the second gas turbine engine is driven by commanding fuel combustion based on the operating mode. A high speed spool of the first gas turbine engine is accelerated, and fuel combustion is commanded at the first gas turbine engine based on a transition of the operating mode to perform a starting operation of the first gas turbine engine.

In addition to one or more of the features described above or below, or as an alternative, further embodiments may include controlling the low spool motor responsive to the thrust command with the operating mode being taxi or descent.

In addition to one or more of the features described above or below, or as an alternative, further embodiments may include controlling a high spool motor to accelerate the high speed spool during the starting operation of the first gas turbine engine while the low spool motor controls thrust produced by a low speed spool of the first gas turbine engine, where the high spool motor is configured to augment rotational power of the high speed spool.

In addition to one or more of the features described above or below, or as an alternative, further embodiments may include extracting power, by at least one generator, from the second gas turbine engine, and selectively providing electrical power from the at least one generator to either or both of the low spool motor and the high spool motor.

In addition to one or more of the features described above or below, or as an alternative, further embodiments may include powering one or more accessories of the first gas turbine engine while the first gas turbine engine is not commanded to combust fuel.

In addition to one or more of the features described above or below, or as an alternative, further embodiments may include controlling the low spool motor to drive rotation of the low speed spool responsive to the thrust command at an idle condition of the first gas turbine engine.

In addition to one or more of the features described above or below, or as an alternative, further embodiments may include controlling power delivery to the high speed spool while the first gas turbine engine is not commanded to combust fuel, and the power delivery can be operable to rotate or heat the high speed spool.

In addition to one or more of the features described above or below, or as an alternative, further embodiments may include changing a designation of the first gas turbine engine and the second gas turbine engine between flights of the hybrid aircraft.

A technical effect of the apparatus, systems and methods is achieved by performing asymmetric hybrid aircraft idle.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
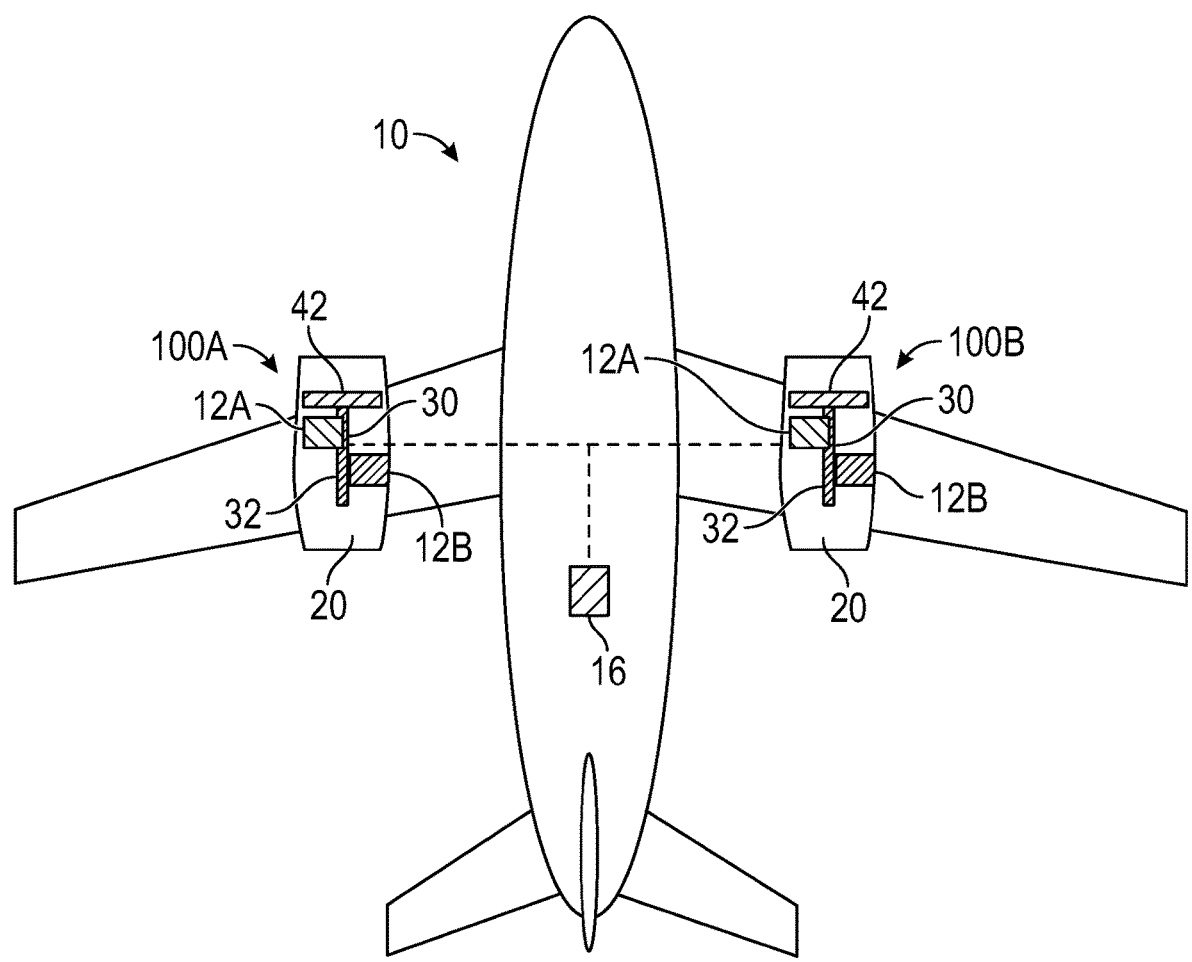
FIG. 1 is a schematic diagram of a hybrid aircraft, in accordance with an embodiment of the disclosure.

FIG. 1 schematically illustrates a hybrid aircraft 10 that includes a pair of hybrid electric propulsion systems 100A, 100B (also referred to as hybrid gas turbine engines 100A, 100B or hybrid propulsion systems 100A, 100B). Each of the hybrid electric propulsion systems 100A, 100B includes a gas turbine engine 20 with a low speed spool 30 configured to drive rotation of a fan 42. Gas turbine engine 20 also includes a high speed spool 32 that operates at higher speeds and pressures than the low speed spool 30. A motor 12 is configured to augment rotational power of the gas turbine engine 20, for instance, by driving rotation of the low speed spool 30 and fan 42. In some embodiments, one or more of the gas turbine engines 20 can include another motor 12 configured to drive the high speed spool 32. A generator 13 can be configured to extract rotational power of the gas turbine engine 20, such as from the low speed spool 30 or the high speed spool 32, and produce electric power. At least one power source 16 of the hybrid aircraft 10 can provide electrical power to the motor 12 of the gas turbine engines 20 and/or other components of the hybrid aircraft 10. The power source 16 can be a stored energy source or a generator driven by an engine. For example, the power source 16 can include one or more of a battery, a super capacitor, an ultra capacitor, a fuel cell, a flywheel, and the like. Where the hybrid aircraft 10 includes an additional thermal engine (not depicted), such as an auxiliary power unit, the power source 16 can be a generator driven by the thermal engine. Further, the generator 13 of one of the hybrid electric propulsion systems 100A, 100B can provide power to the other hybrid electric propulsion systems 100A, 100B. For example, if the hybrid electric propulsion system 100A is combusting fuel, the hybrid electric propulsion system 100B may operate without burning fuel and can drive the low speed spool 30 and fan 42 based on the motor 12 receiving electric power from the generator 13 of the hybrid electric propulsion system 100A and/or the power source 16. Further, if the hybrid electric propulsion system 100B is combusting fuel, the low speed spool 30 of the hybrid electric propulsion system 100A can be driven based on the motor 12 receiving electric power from the generator 13 of the hybrid electric propulsion system 100B and/or the power source 16.

While the example of FIG. 1 illustrates a simplified example of the gas turbine engine 20, it will be understood that any number of spools, and inclusion or omission of other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
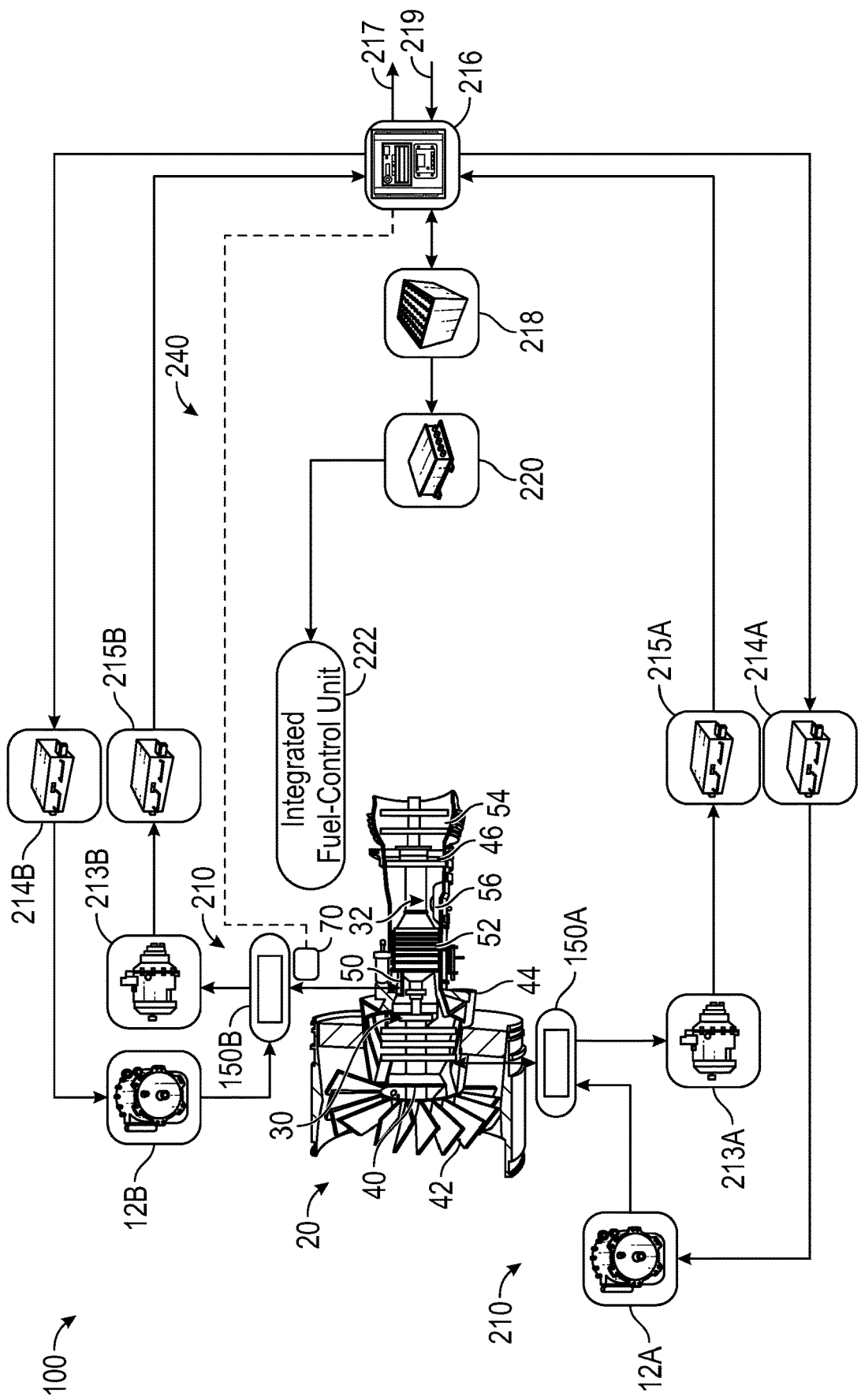
FIG. 2 is a schematic diagram of a hybrid electric propulsion system, in accordance with an embodiment of the disclosure.

FIG. 2 illustrates a hybrid electric propulsion system 100 (also referred to as hybrid gas turbine engine 100 or hybrid propulsion system 100) as a further example of the hybrid electric propulsion system 100A, 100B of FIG. 1. In the example of FIG. 2, the hybrid electric propulsion system 100 includes gas turbine engine 20 operably coupled to an electrical power system 210 as part of a hybrid electric aircraft, such as hybrid aircraft 10 of FIG. 1. One or more mechanical power transmissions 150 (e.g., 150A, 150B) can be operably coupled between the gas turbine engine 20 and the electrical power system 210. The gas turbine engine 20 includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50). The electrical power system 210 can include a low spool motor 12A configured to augment rotational power of the low speed spool 30 and a high spool motor 12B configured to augment rotational power of the high speed spool 32. The low spool motor 12A can control thrust by driving rotation of the fan 42, and the high spool motor 12B can act as a starter motor in driving rotation of the high speed spool 32. Although two motors 12A, 12B are depicted in FIG. 2, it will be understood that there may be only a single motor (e.g., only low spool motor 12A) or additional motors (not depicted). Further, the motors 12A, 12B can be electric motors or alternate power sources may be used, such as hydraulic motors, pneumatic motors, and other such types of motors known in the art. The electrical power system 210 can also include a low spool generator 13A configured to convert rotational power of the low speed spool 30 to electric power and a high spool generator 13B configured to convert rotational power of the high speed spool 32 to electric power. Although two electric generators 13A, 13B (generally referred to as generators 13) are depicted in FIG.

2, it will be understood that there may be only a single electric generator (e.g., only electric generator 13B) or additional electric generators (not depicted). In some embodiments, one or more of the motors 12A, 12B can be configured as a motor or a generator depending upon an operational mode or system configuration, and thus one or more of the electric generators 13A, 13B may be omitted.

In the example of FIG. 2, the mechanical power transmission 150A includes a gearbox operably coupled between the inner shaft 40 and a combination of the low spool motor 12A and low spool generator 13A. The mechanical power transmission 150B can include a gearbox operably coupled between the outer shaft 50 and a combination of the high spool motor 12B and high spool generator 13B. In embodiments where the motors 12A, 12B are configurable between a motor and generator operating mode, the mechanical power transmission 150A, 150B can include a clutch or other interfacing element(s).

The electrical power system 210 can also include motor drive electronics 214A, 214B operable to condition current to the motors 12A, 12B (e.g., DC-to-AC converters). The electrical power system 210 can also include rectifier electronics 215A, 215B operable to condition current from the electric generators 13A, 13B (e.g., AC-to-DC converters). The motor drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between energy storage system 218 and electronics 214A, 214B, 215A, 215B. The energy storage system 218 can include one or more energy storage devices, such as a battery, a super capacitor, an ultra capacitor, and the like. The energy storage management system 216 can facilitate various power transfers within the hybrid electric propulsion system 100. The energy storage management system 216 may also transfer power to one or more electric motors on the engine, or to external loads 217 and receive power from one or more external power sources 219 (e.g., power source 16 of FIG. 1, aircraft power, auxiliary power unit power, cross-engine power, and the like).

A power conditioning unit 220 and/or other components can be powered by the energy storage system 218. The power conditioning unit 220 can distribute electric power to support actuation and other functions of the gas turbine engine 20. For example, the power conditioning unit 220 can power an integrated fuel control unit 222 to control fuel flow to the gas turbine engine 20. The power conditioning unit 220 can also power a plurality of actuators (not depicted), such as bleed actuators, vane actuators, and the like.

One or more accessories 70 can also be driven by or otherwise interface with the gas turbine engine 20. Examples of accessories 70 can include oil pumps, fuel pumps, and other such components. As one example, the accessories 70 include an oil pump driven through gearing, such as mechanical power transmission 150B, in response to rotation of the high speed spool 32 and/or the high spool motor 12B. Alternatively, accessories 70 can be electrically driven through power provided by the energy storage management system 216 or other such sources of electrical power.

Engagement and operation of the low spool motor 12A, low spool generator 13A, high spool motor 12B, and high spool generator 13B can change depending upon an operating state of the gas turbine engine 20 and any commands received. Collectively, any effectors that can change a state of the gas turbine engine 20 and/or the electrical power system 210 may be referred to as hybrid electric system control effectors 240. Examples of the hybrid electric system control effectors 240 can include the motors 12A, 12B, electric generators 13A, 13B, integrated fuel control unit 222, and/or other elements (not depicted).

Figure 3:
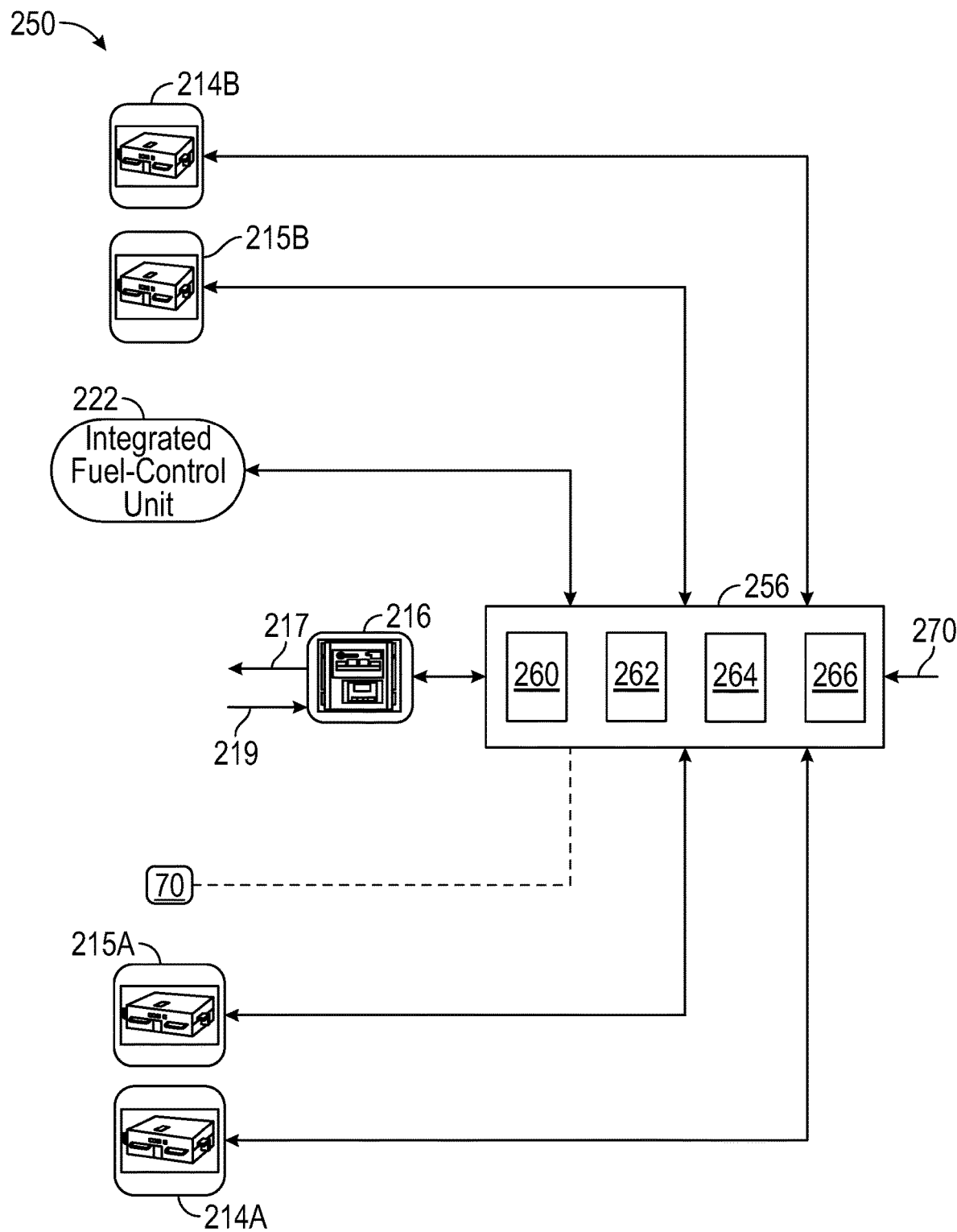
FIG. 3 is a schematic diagram of control signal paths of a hybrid electric propulsion system, in accordance with an embodiment of the disclosure.

FIG. 3 is a schematic diagram of control signal paths 250 of the hybrid electric propulsion system 100 of FIG. 2 and is described with continued reference to FIGS. 1 and 2. A controller 256 can interface with the motor drive electronics 214A, 214B, rectifier electronics 215A, 215B, energy storage management system 216, integrated fuel control unit 222, accessories 70, and/or other components (not depicted) of the hybrid electric propulsion system 100. In embodiments, the controller 256 can control and monitor for fault conditions of the gas turbine engine 20 and/or the electrical power system 210. For example, the controller 256 can be integrally formed or otherwise in communication with a full authority digital engine control (FADEC) of the gas turbine engine 20. Alternatively, the controller 256 can be an aircraft level control or be distributed between one or more systems of the hybrid aircraft 10 of FIG. 1. In embodiments, the controller 256 can include a processing system 260, a memory system 262, and an input/output interface 264. The controller 256 can also include various operational controls, such as a hybrid engine control 266 that controls the hybrid electric system control effectors 240 further described herein, for instance, based on a thrust command 270. The thrust command 270 can be a throttle lever angle or a command derived based on a throttle lever angle control of the hybrid aircraft 10 of FIG. 1.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 214A, 214B, rectifier electronics 215A, 215B, energy storage management system 216, integrated fuel control unit 222, accessories 70, and/or other components (not depicted) of the hybrid electric propulsion system 100. The controller 256 provides a means for controlling the hybrid electric system control effectors 240 using a hybrid engine control 266 that can be dynamically updated during operation of the hybrid electric propulsion system 100. The means for controlling the hybrid electric system control effectors 240 can be otherwise subdivided, distributed, or combined with other control elements.

The controller 256 with hybrid engine control 266 can apply control laws and access/update models to determine how to control and transfer power between the low speed spool 30 and high speed spool 32, as well as power transfers between multiple gas turbine engines 20. For example, sensed and/or derived parameters related to speed, flow rate, pressure ratios, temperature, thrust, and the like can be used to establish operational schedules and transition limits to maintain efficient operation of the gas turbine engine 20. For instance, an operating mode of the gas turbine engine 20, such as idle, takeoff, climb, cruise, and descent can have different power settings, thrust requirements, flow requirements, and temperature effects. With respect to the hybrid aircraft 10 of FIG. 1, each of the gas turbine engines 20 can have different settings and splits between electric and fuel-burn based operations in one or more of the operating modes. The hybrid engine control 266 can control electric current provided to the low spool motor 12A and high spool motor 12B and loading effects of the low spool generator 13A and high spool generator 13B. The hybrid engine control 266 can also determine a power split between delivering fuel to the combustor 56 and using the low spool motor 12A and/or high spool motor 12B to power rotation within the gas turbine engine 20.

In embodiments, the controller 256 can blend the power distribution between the hybrid electric system control effectors 240 and fuel burn in the combustor 56. From a pilot's perspective, the setting of a throttle lever angle produces thrust command 270 without the pilot having to distinguish between whether motor-based thrust or fuel burn based thrust is needed, although the pilot may control whether fuel is on or off. With respect to the hybrid aircraft 10, the hybrid electric propulsion systems 100A, 100B can be independently controlled such that one of the hybrid electric propulsion systems 100A, 100B is operating in a fuel burning mode while the other of the hybrid electric propulsion systems 100A, 100B is operated using the low spool motor 12A and/or the high spool motor 12B. Such a mixed operating mode may be used, for instance, during descent of the hybrid aircraft 10, where thrust is desired from both gas turbine engines 20, but only one of the gas turbine engines 20 actively burns fuel. Further, embodiments can support an e-taxi mode with warmup time to delay starting of the gas turbine engines 20 until reaching a location on the taxiway away from a boarding gate. Thus, asymmetric idle of the hybrid aircraft 10 can be achieved by operating one of the gas turbine engines 20 electrically and the other using fuel burn, particularly at low-power/idle modes of operation.

Figure 4:
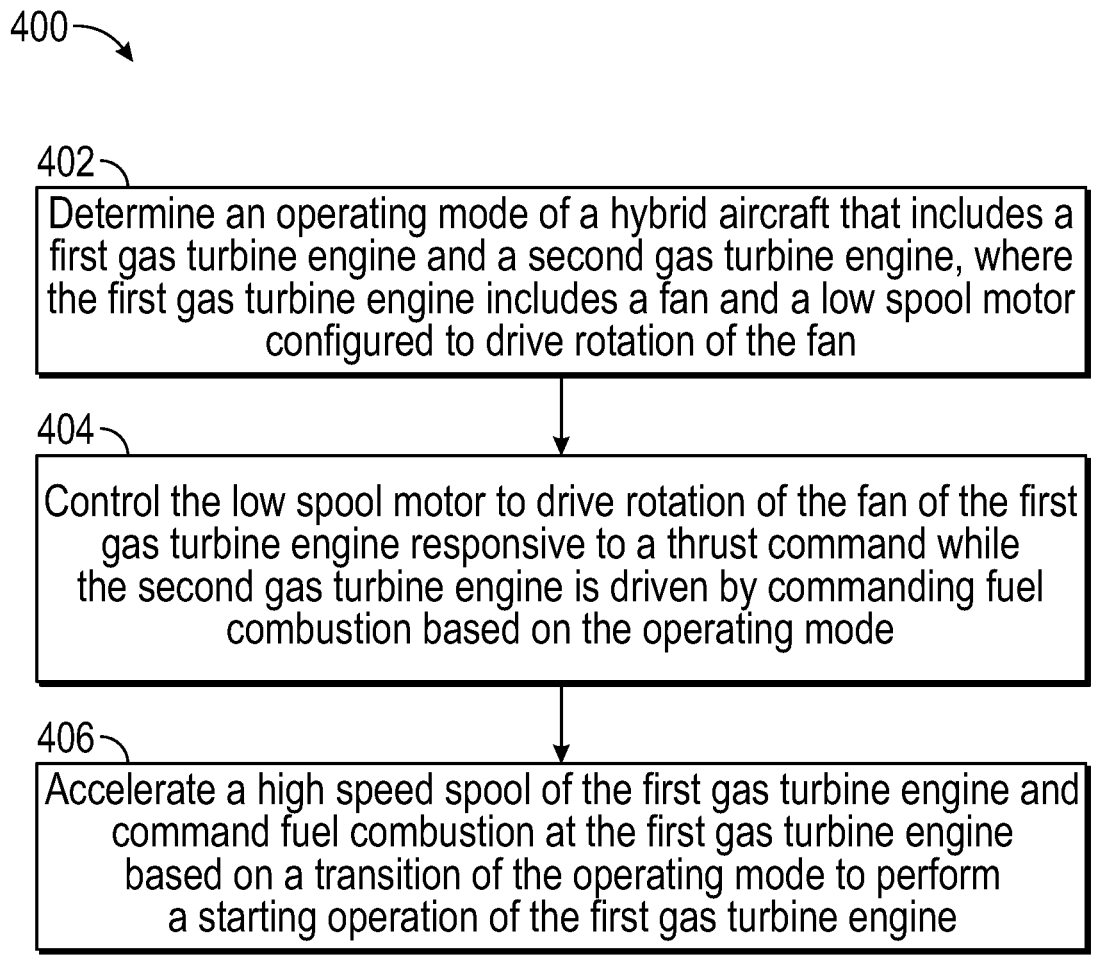
FIG. 4 is a flow chart illustrating a method, in accordance with an embodiment of the disclosure.

Referring now to FIG. 4 with continued reference to FIGS. 1-3, FIG. 4 is a flow chart illustrating a method 400 for providing asymmetric hybrid aircraft idle, in accordance with an embodiment. The method 400 may be performed, for example, by the hybrid aircraft 10 through the hybrid electric propulsion systems 100A, 100B of FIG. 1. For purposes of explanation, the method 400 is described primarily with respect to the hybrid electric propulsion system 100 of FIG. 2; however, it will be understood that the method 400 can be performed on other configurations (not depicted).

Method 400 pertains to the controller 256 executing embedded code for the starting and thrust control using hybrid engine control 266 along with other control functions, where the controller 256 can be an aircraft-level control or distributed between aircraft and engine system levels of control. At block 402, the controller 256 can determine an operating mode of the hybrid aircraft 10 including a first gas turbine engine 20 of hybrid electric propulsion system 100A and a second gas turbine engine 20 of hybrid electric propulsion systems 100B, where the first gas turbine engine 20 includes a fan 42 and a low spool motor 12A configured to drive rotation of the fan 42. The controller 256 can receive a thrust command 270 for each gas turbine engine 20, where each gas turbine engine 20 includes a low speed spool 30, a high speed spool 32, and a combustor 56. The thrust command 270 can be different between the first and second gas turbine engines 20, or the thrust command 270 can be the same for both the first and second gas turbine engines 20.

At block 404, the controller 256 can control a low spool motor 12A to drive rotation of the fan 42 of the first gas turbine engine 20 responsive to a thrust command 270 while the second gas turbine engine 20 is driven by commanding fuel combustion based on the operating mode. Fuel combustion can be commanded as a complete shut off of fuel flow to prevent fuel burn depending upon an operating state of the first gas turbine engine 20. For example, the controller 256 can output a command of no fuel, fuel flow off, and/or otherwise effectively disable or reduce fuel flow as targeted. The operating state can depend on a combination of commands, conditions, and modes, such as an e-taxi mode, a starting mode, a ground idle mode, a takeoff mode, a climb mode, a cruise mode, an in-flight idle mode, a descent mode, a landing mode, and other such modes. The controller 256 can determine an allocation of the thrust command 270 between commanding fuel flow to the combustor 56 and electric current to the low spool motor 12A based on the operating state of the first and second gas turbine engines 20 and a throttle lever angle, where the throttle lever angle can be received from a pilot control, an auto-pilot control, or other such source on the hybrid aircraft 10. The low spool motor 12A can be powered by one or more of a generator, an energy storage system, and a power source 16 external to the gas turbine engine 20. The low spool motor 12A can be controlled responsive to the thrust command 270 with the operating mode being taxi or descent.

At block 406, the controller 256 can accelerate the high speed spool 32 of the first gas turbine engine 20 and command fuel combustion at the first gas turbine engine 20 based on a transition of the operating mode to perform a starting operation of the first gas turbine engine 20. The controller 256 can control a high spool motor 12B to accelerate the high speed spool 32 during the starting operation of the first gas turbine engine 20 while the low spool motor 12A controls thrust produced by the low speed spool 30 of the first gas turbine engine 20, where the high spool motor 12B is configured to augment rotational power of the high speed spool 32.

The starting operation can include a ground-based start or an in-flight restart. At least one generator 13 can extract power from the second gas turbine engine 20. Electrical power from the at least one generator 13 (e.g., low spool generator 13A and/or high spool generator 13B) can be selectively provided to either or both of the low spool motor 12A and the high spool motor 12B. The low spool motor 12A can be powered by one or more of a generator 13, an energy storage system 218, and a power source 16 external to the first gas turbine engine 20. Power source selection can depend on the available power and allocation of power between systems of the hybrid aircraft 10. For instance, using electric power from one of the gas turbine engines 20 burning fuel can allow that engine to operate at a higher thermal efficiency by using a higher power setting. A greater amount of battery power or other stored energy from the energy storage system 218 may be available after a recharge event on the ground (e.g., at a gate) or during flight. Some embodiments can support recharging during operation of the hybrid aircraft 10, such as during cruise.

One or more accessories 70 of the first gas turbine engine 20 can be powered while the first gas turbine engine 20 is not commanded by the controller 256 to combust fuel although the controller 256 is configured and capable of causing fuel flow to the first gas turbine engine 20. The low spool motor 12A can be controlled to drive rotation of the low speed spool 30 responsive to the thrust command 270 at an idle condition of the first gas turbine engine 20. Power delivery can be controlled to the high speed spool 32 while the first gas turbine engine 20 is not commanded by the controller 256 to combust fuel, and the power delivery can be operable to rotate or heat the high speed spool 32. Rotation or heating of the high speed spool 32 can keep accessories 70 active and prepare for faster starting cycle times, for instance, by driving oil circulation and oil heating. A designation of the first gas turbine engine 20 and the second gas turbine engine 20 can be changed between flights of the hybrid aircraft 10 to alternate which engine is burning fuel in an idle mode while the other operates on electric power. The designation needed not change for each flight and may be based on various selection criteria, such as deterioration, in order to optimize fleet management.

Embodiments of the invention can provide a number of advantages and benefits. For instance, compared to conventional descent, fuel burn can be reduced. Using the energy storage system 218 with recharging during cruise can support the use of stored energy collected nearer to cruise efficiency to power descent. Driving rotation of the fan 42 using the low spool motor 12A can reduce a yawing moment and improve aerodynamics of the hybrid aircraft 10 during descent as compared to fully shutting down one of the gas turbine engines 20. This can also improve engine thermal efficiency of the gas turbine engine 20 by continuing to burn fuel with higher power operation and improve engine restarting by keeping components of the electrically-driven gas turbine engine 20 rotating. In a taxi operating mode, fuel burn can be reduced, yawing can be reduced, and higher propulsive efficiency can be achieved when thrust is needed with both fans 42 active with one electrically driven and the other fuel-burn driven. Using the high spool motor 12B to support engine restart can prevent flight envelope constraints that may exist when using an auxiliary power unit and/or cross engine bleed to support engine restart.

While the above description has described the flow process of FIG. 4 in a particular order, it should be appreciated that unless otherwise specifically required in the attached claims that the ordering of the steps may be varied. Also, it is clear to one of ordinary skill in the art that, the asymmetric hybrid aircraft idle described herein can be combined with aircraft and propulsion system control features, such as fuel flow control, power management, emergency operation, and the like.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system of a hybrid aircraft, the system comprising:
a first gas turbine engine comprising a fan, a high speed spool, a low spool motor configured to drive rotation of the fan, and a high spool motor configured to augment rotational power of the high speed spool;
a second gas turbine engine; and
a controller operable to:
determine an operating mode of the hybrid aircraft;
control the low spool motor to drive rotation of the fan of the first gas turbine engine responsive to a thrust command while the second gas turbine engine is driven by commanding fuel combustion based on the operating mode and while the first gas turbine engine is capable of operating with fuel combustion; and
control the high spool motor to accelerate the high speed spool of the first gas turbine engine to prepare for starting while the low spool motor drives rotation of the fan; and
command fuel combustion at the first gas turbine engine based on a transition of the operating mode to perform a starting operation of the first gas turbine engine.

2. The system of claim 1, wherein the controller is further operable to control the low spool motor responsive to the thrust command with the operating mode being taxi or descent, and wherein the thrust command is based on a throttle lever angle control of the hybrid aircraft that produces the thrust command for both motor-based thrust and fuel burn based thrust.

3. The system of claim 1, wherein the controller is configured to control the high spool motor to accelerate the high speed spool during the starting operation of the first gas turbine engine while the low spool motor controls thrust produced by a low speed spool of the first gas turbine engine.

4. The system of claim 3, wherein the starting operation comprises a ground-based start or an in-flight restart.

5. The system of claim 3, further comprising:
at least one generator configured to extract power from the second gas turbine engine, wherein the controller is configured to selectively provide electrical power from the at least one generator to either or both of the low spool motor and the high spool motor.

6. The system of claim 1, wherein the low spool motor is powered by one or more of a generator, an energy storage system, and a power source external to the first gas turbine engine.

7. The system of claim 1, wherein one or more accessories of the first gas turbine engine are powered while the first gas turbine engine is not commanded to combust fuel.

8. The system of claim 1, wherein the controller is operable to control the low spool motor to drive rotation of the low speed spool responsive to the thrust command at an idle condition of the first gas turbine engine.

9. The system of claim 1, wherein the controller is operable to control power delivery to the high speed spool while the first gas turbine engine is not commanded to combust fuel, and the power delivery is operable to rotate or heat the high speed spool.

10. The system of claim 1, wherein the controller is operable to change a designation of the first gas turbine engine and the second gas turbine engine between flights of the hybrid aircraft.

11. A method comprising:
determining an operating mode of a hybrid aircraft comprising a first gas turbine engine and a second gas turbine engine, wherein the first gas turbine engine comprises a fan and a low spool motor configured to drive rotation of the fan;
controlling the low spool motor to drive rotation of the fan of the first gas turbine engine responsive to a thrust command while the second gas turbine engine is driven by commanding fuel combustion based on the operating mode and while the first gas turbine engine is capable of operating with fuel combustion;
controlling a high spool motor to accelerate a high speed spool of the first gas turbine engine to prepare for starting while the low spool motor drives rotation of the fan; and
commanding fuel combustion at the first gas turbine engine based on a transition of the operating mode to perform a starting operation of the first gas turbine engine.

12. The method of claim 11, further comprising:
controlling the low spool motor responsive to the thrust command with the operating mode being taxi or descent, and wherein the thrust command is based on a throttle lever angle control of the hybrid aircraft that produces the thrust command for both motor-based thrust and fuel burn based thrust.

13. The method of claim 11, further comprising:
controlling the high spool motor to accelerate the high speed spool during the starting operation of the first gas turbine engine while the low spool motor controls thrust produced by a low speed spool of the first gas turbine engine, wherein the high spool motor is configured to augment rotational power of the high speed spool.

14. The method of claim 13, wherein the starting operation comprises a ground-based start or an in-flight restart.

15. The method of claim 13, further comprising:
extracting power, by at least one generator, from the second gas turbine engine; and
selectively providing electrical power from the at least one generator to either or both of the low spool motor and the high spool motor.

16. The method of claim 11, wherein the low spool motor is powered by one or more of a generator, an energy storage system, and a power source external to the first gas turbine engine.

17. The method of claim 11, further comprising:
powering one or more accessories of the first gas turbine engine while the first gas turbine engine is not commanded to combust fuel.

18. The method of claim 11, further comprising:
controlling the low spool motor to drive rotation of the low speed spool responsive to the thrust command at an idle condition of the first gas turbine engine.

19. The method of claim 11, further comprising:
controlling power delivery to the high speed spool while the first gas turbine engine is not commanded to combust fuel, and the power delivery is operable to rotate or heat the high speed spool.

20. The method of claim 11, further comprising:
changing a designation of the first gas turbine engine and the second gas turbine engine between flights of the hybrid aircraft.

* * * * *